United States Patent
Salopelto

(12) 
(10) Patent No.: US 6,205,707 B1
(45) Date of Patent: *Mar. 27, 2001

(54) METHOD FOR THE FERTILIZATION OF SOIL FOR CULTIVATED PLANTS

(75) Inventor: Juha Salopelto, Tuusula (FI)

(73) Assignee: Suomen Rehu Oy, Helsinki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,118

(22) Filed: Jun. 17, 1997

(30) Foreign Application Priority Data

Jun. 18, 1996 (FI) .................................................. 962537

(51) Int. Cl.[7] .................................................. A01C 21/00
(52) U.S. Cl. ........................ 47/58; 47/48.5; 71/1; 71/11; 71/54
(58) Field of Search ........................... 47/58, 48.5; 71/54, 71/11, 1

(56) References Cited

PUBLICATIONS

Holbrook et al. J Agri Science, 1989, vol. 112, No. 3 p. 403–411, 1989.*
Shimshi et al. Irrigation Science, vol. 1 No. 1, 1978, p. 27–38, 1978.*
Fick, GW. Agronomy Journal, vol. 76, No. 2, 1984 p. 235–239, 1984.*

* cited by examiner

Primary Examiner—Phuong T. Bui
(74) Attorney, Agent, or Firm—Altera Law Group, LLC

(57) ABSTRACT

A method for the fertilization of soil for cultivated plants, whereby nitrogen fertilizer is spread over the cultivated area in conjunction with the sowing of cultivated plants and later during the growing season more fertilizer is spread over the cultivated area. In this method, a basic amount of fertilizer corresponding to a basic crop smaller than the maximum crop is spread over the cultivated area in conjunction with the sowing; a supplementary amount or fertilizer is spread on a limited area; the growth that has taken place in the cultivated area and in the area with supplementary fertilization during a certain time since the beginning of the growing season is measured; the measured growth that has taken place in the cultivated area is compared with the measured growth of the plants that has taken place in the area with supplementary fertilization in the same growing conditions, and, if the growth in the area with supplementary fertilization exceeds the growth in the cultivated area, supplementary fertilization is carried out in the cultivated area, corresponding to the growth of the plants in the area with supplementary fertilization as compared with the growth of the plants in the cultivated area and to the amount of fertilizer used in the cultivated area.

12 Claims, 1 Drawing Sheet

METHOD FOR THE FERTILIZATION OF SOIL FOR CULTIVATED PLANTS

FIELD OF THE INVENTION

The present invention relates to a method for the fertilization of soil for cultivated plants, whereby nitrogen fertilizer is spread over the cultivated area in conjunction with the sowing of cultivated plants and more fertilizer is spread over the cultivated area later during the growing season.

In particular, the present invention relates to nitrogen fertilization carried out in conjunction with the cultivation of cereals, although the method can be applied in conjunction with the fertilization of soil for other plants as well by making corresponding changes in the amounts of fertilizer, In this context, 'cereals' refers to all known cereals, such as wheat, barley, oats, rye, rape, turnip rape, maize, rice, etc. 'Other plants' refers to other useful plants cultivated on fields and corresponding cultivation areas. In the present application, 1 kg of nitrogen fertilizer specifically means an amount of fertilizer that contains 1 kg of nitrogen.

BACKGROUND OF THE INVENTION

In field husbandry, in principle the soil should be fertilized with nitrogen used in amounts corresponding to the quantity of nitrogen removed from the soil via harvesting. Fertilization recommendations are based on long-term average crop yields obtained from extensive test material. The recommendations ignore the fact that there are large variations between growing seasons in respect of the formation of crop yields. Water supply is often a minimum factor restricting growth, and when water is in short supply, the crops per hectare fall below the long-term averages. Furthermore, because Finland is situated at the northern limits of the cultivable area, from time to time there are fail-years, e.g. due to cold weather conditions, in which the crops remain considerably be-low long-term averages. In other countries as well, the crops per hectare vary correspondingly, due to variations in the growing conditions, in the first place weather conditions.

According to the fertilization recommendation for Finland, the average amount of nitrogen fertilizer to be spread on the cultivated area in mineral soil is 90–110 kg/ha. If the amount of fertilizer used is 110 kg/ha, the crop yield should be over 5000 kg/ha for the amount of nitrogen removed from the soil with the crop to correspond to the amount of nitrogen spread over the cultivated area in conjunction with sowing. Very often, however, e.g. when growth is limited by insufficient water supply, the crops per hectare fall as low as below 3000 kg/ha. In this case, a large overdose of nitrogen remains in the soil, and this nitrogen is liable to be washed away, denitrified, or it may combine with the soil in a form unusable for plants. The average crops in Finland in recent years have been slightly over 3000 kg/ha. Therefore, in the long term, the fields have been over-fertilized. In other countries, too, there are large variations in crops, depending on the weather and other conditions prevailing in each country and their changes. However, the problem resulting from over-fertilization is encountered in other countries as well, especially when there are unexpected changes in weather conditions and in the case of drought.

The fertilizer left unused because of over-fertilization, i.e. the production investment corresponding to the excess amount of fertilizer, has not yielded any returns In cultivation. In addition, the excess nitrogen is mainly washed away into water systems, resulting in a significant increase in the nitrogen load on water systems and therefore pollution. Moreover, in this case the fodder and food industries cannot get raw material of a quality consistent with the aim.

SUMMARY OF THE INVENTION

The object of the present invention is to eliminate the drawbacks described above.

Thus, the object of the invention is to develop methods for fertilizing the soil for cultivated plants in such a way that the grower will get a better return on the production investment made in the form of fertilization and that the amount of fertilizer washed away into water systems and polluting them will be substantially reduced.

A specific object of the invention is to develop fertilizing methods so that the fertilization carried out in conjunction with the sowing should better correspond to realistic crop prospects in the light of the average crops per hectare obtained in recent years. A further object of the invention is to develop methods for fertilizing the soil for cultivated plants in such a way that the amount of fertilizer spread on the cultivated area should more effectually correlate with possible larger crops as well.

As for the features characteristic of the invention, reference is made to the claims.

The invention is based on extensive investigations, during which it was unexpectedly established that the growth and/or nitrogen nutrient situation of cultivated plants, i.e. the need for nitrogen fertilization and the utilization of fertilizer by the plants can be measured during the growing season and, based on the measurement results, supplementary fertilization can be carried out as needed. In particular, the method is based on measuring the growth and/or nitrogen nutrient situation, e.g. the chlorophyll concentration, of cultivated plants during a certain period of time from the beginning of the growing season when an amount of fertilizer corresponding to a basic crop smaller than the local maximum crop is used and, similarly, on measuring the growth of cultivated plants in the same growing conditions in an area with supplementary fertilization, e.g. an over-fertilized area (e.g. a limited part of the cultivated area), where an overdose of fertilizer has been added so that the plants in this limited fertilizer window area can take as much nitrogen as they are able to take and utilize in the prevailing conditions; the amount of nitrogen fertilizer added in the fertilizer window may be e.g. 30–50% above the amount used in the rest of the cultivated area. A particularly advantageous approach is to determine the chlorophyll concentration in the plant leaves in the fertilizer window and outside it; it has been established that the chlorophyll concentration correlates quite well with the amount of nitrogen contained in the plant leaves, and so the chlorophyll concentration in the fertilizer window and outside it gives a relatively accurate indication of the amount of nitrogen fertilizer used by the plants and therefore of the amount of nitrogen needed in the production area. From the measurement of the growth of the plants in the cultivated area as compared with the growth in the area with supplementary fertilization, it is thus possible to establish whether the plants in the cultivated area are suffering from under-fertilization, and if so then this can be corrected via general supplementary fertilization of the cultivated area if the growth in the extra-fertilized area significantly exceeds the growth in the cultivated area.

The amount of growth in a given area can be measured by any method known in itself, e.g. by weighing the growth per unit area that has taker. place in the area, e.g. the amount of aerial growth, i.e. phytomass, or if desired, the entire growth, i.e. biomass (comprising aerial parts and roots).

The growth of cultivated plants can thus be monitored by measuring the nitrogen nutrient situation of the plants, e.g. by determining the chlorophyll concentration in the plants in a cultivated area with basic fertilization and in an area with supplementary fertilization. Supplementary fertilization is carried out if the growth and/or the amount of nitrogen, e.g. the chlorophyll concentration in the plants in the area with supplementary fertilization is substantially, e.g. over 10%, preferably over 20%, greater than in the cultivated area without supplementary fertilization.

In conjunction with the investigations, methods for predicting the crop yield at a given time in the growing season so that it is possible already during the growing season to relatively accurately determine the prospective crop yield and the supplementary fertilization that may be required on the basis of the forecast and/or the growth that has already taken place during the growing season.

A new feature in the method is especially the principle of measuring the growth in an area with basic fertilization during the growing season and comparing it with measured growth that has taken place in an over-fertilized area and determining the need for supplementary fertilization on the basis of these measurements. Another new feature in the method is that the nitrogen nutrient situation and/or chlorophyll situation of cultivated plants is determined during the growing season in an area with basic fertilization and that the need for supplementary fertilization is determined on this basis. A further new feature in the method is that, to determine the amount of supplementary fertilization required, the prospective crop, i.e. the crop forecast and the amount of nitrogen contained in the plants as measured during the growing season are combined with the amount of fertilizer used.

According to the invention, a basic amount of fertilizer corresponding to a basic crop smaller than the maximum crop is spread over the cultivated area in conjunction with the sowing. In a limited portion of the cultivated area, e.g. in a so-called fertilizer window, an amount of supplementary fertilizer is spread. Later during the growing season, the amounts of growth that have taken place in the area with basic fertilization and in the area with supplementary fertilization are determined and these values are compared with each other and the need for supplementary fertilization is determined on the basis of this comparison and the basic fertilization in the cultivated area. Instead of determining the growth of the cultivated plants, it is possible to determine the amounts of nitrogen and/or chlorophyll measured in the cultivated plants in the basic fertilization area and in the extra fertilization area; the need for supplementary fertilization can be determined on the basis of these measurements as above.

A crop forecast can be estimated after the sowing on the basis of the phytomass and heat summation accumulated during the growing season between the time of sowing and the time of measurement, based e.g. on the known fact that the heat summation up to the ripening of the crop is about 1000° in Finland and e.g. about 1300° in Central Europe; the heat summation is calculated by summing the mean values of the temperatures, taken at 0800 hrs, 1400 hrs and 2000 hrs, measured in degrees Celsius and reduced by 5° C., for each day within the calculating period. Thus, a crop forecast can be estimated on the basis of the phytomass, the heat summation and an estimated or statistically calculated heat summation for the remaining growing period. It is to be noted that the numeric value of the heat summation for an area where the method is applied has no importance in itself, in other words, the heat summation for an area may be e.g. 1000°, as in Finland, or 1300°, as in Central Europe, or some other numeric value. The heat summation can be used to produce a crop forecast during the growing season, and the crop forecast can be used to estimate the need for supplementary fertilization in order to achieve a crop consistent with the crop forecast.

The supplementary fertilization can be carried out by any method known in itself, e.g by applying the fertilizer in the form of conventional granular nitrogen fertilizer, as a water solution dosed onto the plant leaves, in conjunction with weed killing or other spraying treatment of growth, or generally by any method, as is known in the art. The supplementary fertilization may be carried out in one phase or several phases.

The amount of nitrogen fertilizer spread in conjunction with the sowing is preferably about 70±10% of the amount of fertilizer corresponding to the maximum crop. The amount of nitrogen fertilizer spread in conjunction with basic fertilization may also be larger or smaller than this. The maximum crop can be defined e.g. as a general average maximum crop for the cultivated area in question or as some other generally known maximum crop value.

Supplementary fertilization is preferably carried out if the difference between the crop forecast and the basic crop is over 10%, preferably over 20% of the crop forecast.

It is to be noted that the above amounts of fertilizer per unit area and the amounts of crop per unit area apply in the first place to Nordic, i.e. Finnish conditions. In other countries, the amounts of fertilizer and crop may vary greatly depending on conditions like moisture, temperature, weather in general, soil quality, plants cultivated, expected harvest etc. according to circumstances in general, The essential point in the invention is expressly that it provides a general method in principle for determining the need for supplementary fertilization and for carrying out supplementary fertilization.

The invention makes it possible to adjust the amount of fertilizer to be spread on the cultivated area so that it closely corresponds to the actual growing conditions so as to avoid over-fertilization in bad growing conditions and, on the other hand, to give the plants the required larger amount of fertilizer corresponding to a larger crop in good growing conditions, thus ensuring a maximal crop. Furthermore, the invention makes it possible for a grower who uses the fertilization method of the invention to get full and maximal returns on the production investment corresponding to the amount of fertilizer used in a given growing area, mainly regardless of the growing conditions during the growing season.

Further, the invention allows a nearly zero nitrogen balance to be maintained in the cultivated area, so that the amount of nitrogen spread over the cultivated area via fertilization corresponds to the amount of nitrogen mainly removed from the cultivated area along with grains and straw via harvesting. Thus, no fertilizer is washed away into water systems and in this respect pollution of water systems remains under control.

In addition, the invention provides the advantage that, in each growing season, food and fodder industries receive the required amount of raw material having the quality aimed at. Moreover, the crop yield can be accurately predicted during the growing season and is therefore known to the industry before harvesting. Consequently, resources corresponding as closely as possible to the actual crop can be reserved in advance for the handling and storage of the crop.

In addition to the obvious advantages mentioned above, the invention substantially improves the efficiency of cultivation of cultivated plants, which in turn generally improves the profitability and economy of the food and fodder industry and food supply in general, This has a very great general importance after the recent major political changes and integration development.

BRIEF DESCRIPTION OF THE DRAWINGS

In the following, the invention is described in detail by the aid of examples of its embodiments by referring to the attached drawings, in which.

DETAILED DESCRIPTION OF PREFERRED EMBODIMENTS

EXAMPLE 1

Fertilization in a Dry Growing Season

Figure 1:
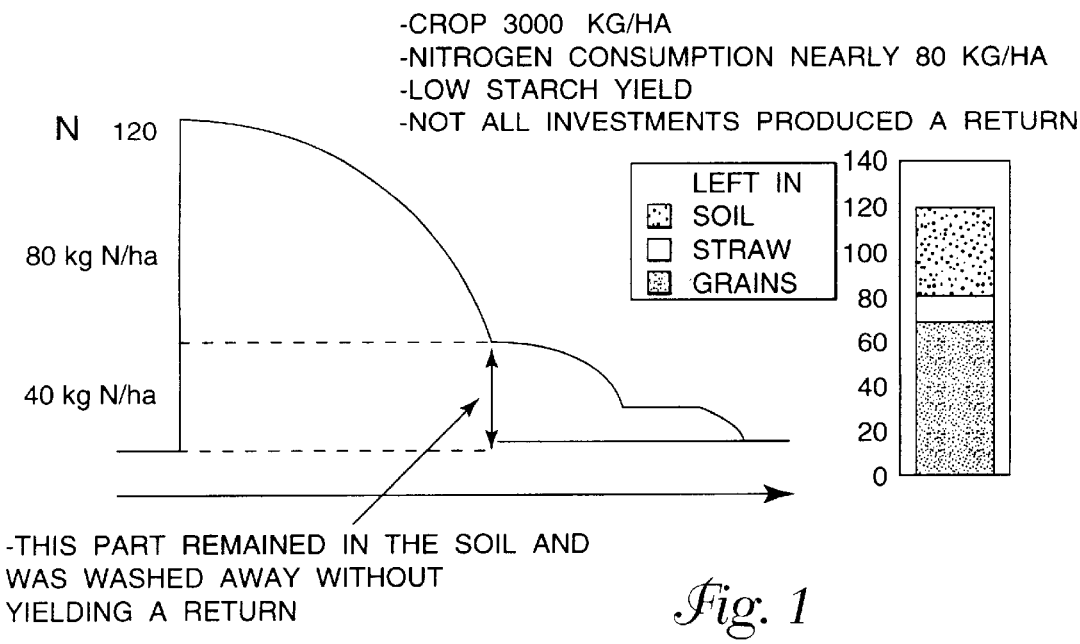
FIG. 1 is a graphic representation of nitrogen consumption in a dry growing season in Finnish conditions when fertilization according to the conventional level is used.
Figure 2:
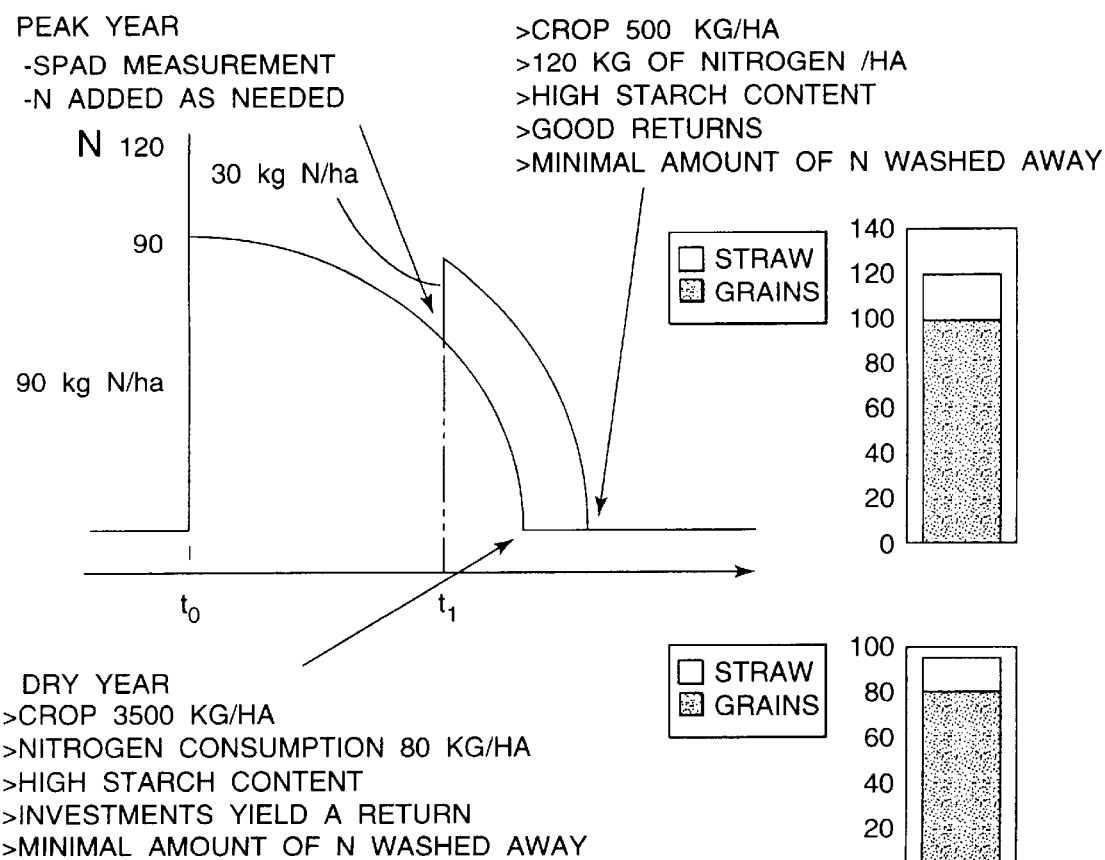
FIG. 2 represents nitrogen consumption in a favourable growing season in Finnish conditions when the method of the invention is used.

In this example, the amount of nitrogen fertilizer was 120 kg, corresponding to a fair grain crop of over 5000 kg/ha, FIG. 1. However, the growing season is dry, which means that growth is restricted by a shortage of water, and the crop yield remains as low as under 3000 kg of grain per hectare, The amount of nitrogen removed with the grains from the cultivated area via harvesting is 80 kg/ha, and the amount of nitrogen remaining in the soil is 40 kg/ha. With the autumn rains, the excess nitrogen begins to be washed away into the water system, and part of it is denitrified into the air.

In a growing year like this, the grower gets no return on the amount of nitrogen left in the soil, and in addition, due to the excess of nitrogen, the protein content of the corn is too high and its energy content is low, so fodder industry cannot get the kind of corn aimed at.

This example describes fertilization in a dry growing season in Finland and it shows the amounts of fertilizer typically used in Finland as well as the corresponding grain crops. The above numeric values for the amounts of fertilizer and crop could be replaced with amounts of fertilizer and crop obtained via local measurement,

EXAMPLE 2

Fertilization According to Growing Season

The amount of fertilizer used is 90 kg/ha, corresponding to a grain crop of about 3500 kg/ha. In the course of the growing season, e.g. at the 4-leaf stage ($t_1$), a crop forecast is calculated using the phytomass and heat summation accumulated between the time of sowing ($t_0$) and the time of measurement ($t_1$). At the same time, the chlorophyll concentration in the plant leaves is determined in an over-fertilized fertilizer window and in the cultivated area. The crop forecast and the chlorophyll concentration (proportional to nitrogen concentration) in the fertilizer window are over 40% higher as compared with the basic crop of 3000 kg/ha and the corresponding chlorophyll concentration in the cultivated area. Based on this determination, the crop forecast is corrected upwards (about 40%) to the value of 5000 kg/ha, and supplementary nitrogen fertilization at 30 kg/ha (nearly 40%) is carried out. In this example, the supplementary fertilization is carried out in one stage, but if desirable, it can also be performed in several stages.

In conjunction with the harvesting it is found that the crop is 5000 kg/ha, the amount of nitrogen removed during harvesting from the cultivated area with the grains is 100 kg/ha and, correspondingly, the amount of nitrogen removed with the straw is 20 kg/ha, so the nitrogen balance remains constant.

If the crop forecast and/or the measurement of chlorophyll, concentration in the plant leaves at time $t_1$ should give a crop prospect of only 3000 kg/ha, supplementary fertilization would be omitted, in which case the original basic fertilization with 90 kg/ha would yield a maximal crop in the particular growing conditions. Thus, the extra cost of supplementary fertilization is avoided and the grower can get a full return on the production investment made in the form of fertilization.

The example represents fertilization in a dry growing season in Finland and it shows the amounts of fertilizer typically used in Finland as well as the corresponding amounts of grain crop.

EXAMPLE 3

In this example, fertilization was carried out on 4 test areas and the grain crop produced/amount of fertilizer used was calculated in conjunction with harvesting. The results are presented in Table 1.

TABLE 1

| Method of fertilization | Grain produced/nitrogen fertilizer used kg/kg |
| --- | --- |
| 1 | 50 |
| 2 | 54 |
| 3 | 52 |

1 - basic fertilization 130 kg of nitrogen/ha, no supplementary fertilization
2 - basic fertilization 80 kg of nitrogen/ha, supplementary fertilization 3 × 15 kg/ha
3 - basic fertilization 100 kg of nitrogen/ha, supplementary fertilization 2 × 15 kg/ha The supplementary fertilization was mainly provided through the foliage by spraying.

This embodiment example shows that nitrogen supplied via the foliage yields a larger crop than nitrogen supplied in the conventional manner via the soil, especially when supplementary fertilization is carried out by the method of the invention by determining a crop forecast on the basis of the heat summation and the phytomass accumulated between the time of sowing and the time of measurement.

EXAMPLE 4

In this example, the basic amount of fertilizer on a feed grain field was 80 kg of N/ha, corresponding to a crop of 3000 kg/ha. Supplementary fertilization at 30 kg/ha was carried out in a fertilizer window, When the feed grain (barley) was at the straw growing stage, the phytomass was weighed in the cultivated area and in the fertilizer window, the results were 0.800 kg/m² and 0.920 kg/m² respectively. From this growth determination, it can be concluded that growth of the cultivated plants in the fertilizer window, where there was a sufficient supply of fertilizer, was about 15% higher than in the cultivated area. Based on this calculation, 15% supplementary fertilization is carried out, i.e. an additional 12 kg of nitrogen/ha is spread on the field.

EXAMPLE 5

In this example, the basic fertilization for a corn (oats) field is 90 kg of N/ha, corresponding to a corn crop of 3500 kg/ha. The amount of fertilizer used in a fertilizer window is 120 kg/ha. At the straw growing stage of the corn, the chlorophyll concentration in the plant leaves was determined using a so-called Spad meter. The result of the spad measurement on the cultivated area is 40 Spad units, while that of the Spad measurement on the fertilizer window is 53 Spad units. Based on the measurement, a decision is made to carry out supplementary fertilization as follows:

$$\text{Supplementary fertilization} = \frac{53-40}{40} \cdot 90 \text{ kg } N/ha = 30 \text{ kg } N/ha$$

If it is desired to raise the chlorophyll concentration (i.e. nitrogen contents) 1 Spad unit, supplementary fertilization may be carried out $$\text{Supplementary fertilization} = \frac{30}{53-40} \text{kg } N/ha = 4.3 \text{ kg } N/ha$$

The embodiment examples are intended to illustrate the invention without limiting it in any way.

What is claimed is:

1. A method for fertilizing soil for a cultivated plant crop having a maximum crop yield, comprising:
   spreading a first amount of fertilizer over a first area while sowing seeds for the cultivated plant crop in the first area, the first amount of fertilizer corresponding to a basic crop yield of the cultivated plant crop, the first amount of fertilizer being smaller than a reference amount of fertilizer corresponding to the maximum crop yield;
   spreading a second amount of the fertilizer on a second area different from the first area, at a time of sowing seeds for the cultivated plant crop in the second area, the second amount of fertilizer being larger than the first amount of fertilizer;
   determining growth of the cultivated plant crop in the first area and in the second area after a growing season has begun;
   comparing the growth in the first area with the growth in the second area;
   calculating a crop forecast yield during a growing season, based on a heat summation accumulated since sowing;
   determining a supplementary amount of fertilizer for the first area, if the growth in the second area exceeds the growth in the first area, from the growths in the first and second areas, from the first amount of fertilizer used in the first area and from a difference between the basic crop yield and the crop forecast yield; and
   spreading the supplementary amount of fertilizer in the first area.

2. A method according to claim 1, wherein spreading the first amount of fertilizer comprises spreading 60–80 percent of an amount of fertilizer corresponding to maximum crop yield.

3. A method according to claim 1, comprising spreading the supplementary amount of fertilizer over the first area if the growth in the second area is more than 10 percent greater than the growth in the first area.

4. A method according to claim 1, comprising spreading the supplementary amount of fertilizer over the first area if the growth in the second area is more than 20 percent greater than the growth in the first area.

5. A method according to claim 1, comprising spreading the supplementary amount of fertilizer over the first area in at least two steps.

6. A method according to claim 1, further comprising determining growth of the cultivated plant crop in the first area and in the second area before pollination.

7. A method according to claim 1, wherein the supplementary amount of fertilizer is determined when the cultivated plant crop is at a 2-leaf stage.

8. A method according to claim 1, wherein determining the growth comprises measuring a nitrogen nutrient content in the cultivated plant crop in the first area and in the second area, and wherein determining the supplementary amount of fertilizer is based on the nitrogen nutrient content.

9. A method according to claim 1, wherein determining the growth comprises determining a chlorophyll concentration for the cultivated plant crop in the first and second areas.

10. A method according to claim 9, further comprising spreading the supplementary amount of fertilizer in the first area if the growth of the cultivated plant crop in the second area is more than 20 percent greater than the growth of the cultivated plant crop in the first area.

11. Method according to claim 1, wherein determining the growth comprises determining a growth of phytomass of the cultivated plant crop in the first area and in the second area.

12. A method according to claim 9, further comprising spreading the supplementary amount of fertilizer in the first area if the growth of the cultivated plant crop in the second area is more than 10 percent greater than the growth of the cultivated plant crop in the first area.

* * * * *